US011611519B1

(12) United States Patent
Kirchhof et al.

(10) Patent No.: US 11,611,519 B1
(45) Date of Patent: Mar. 21, 2023

(54) EVENT TRIGGER VISIBILITY WITHIN A GROUP-BASED COMMUNICATION SYSTEM

(71) Applicant: Slack Technologies, LLC, San Francisco, CA (US)

(72) Inventors: Angela Kirchhof, Denver, CO (US); Michael Brevoort, Littleton, CO (US); Brad Harris, Castle Rock, CO (US); Trevor Suarez, Denver, CO (US); Whitney Levine, New York, NY (US)

(73) Assignee: Slack Technologies, LLC, San Francisco, CA (US)

( * ) Notice: Subject to any disclaimer, the term of this patent is extended or adjusted under 35 U.S.C. 154(b) by 15 days.

(21) Appl. No.: 17/465,430

(22) Filed: Sep. 2, 2021

(51) Int. Cl.
*G06F 15/16* (2006.01)
*H04L 51/046* (2022.01)

(52) U.S. Cl.
CPC .................................. *H04L 51/046* (2013.01)

(58) Field of Classification Search
CPC ...................................................... H04L 51/046
USPC ........................................................ 709/206
See application file for complete search history.

(56) References Cited

U.S. PATENT DOCUMENTS

| | | | | |
|---|---|---|---|---|
| 7,484,213 | B2 * | 1/2009 | Mathew | G06Q 10/10 370/271 |
| 7,721,303 | B2 * | 5/2010 | Alves de Moura | G06F 8/38 709/202 |
| 8,166,120 | B2 * | 4/2012 | Kunz | G06Q 10/107 709/206 |
| 9,471,287 | B2 * | 10/2016 | Rempell | G06F 8/38 |
| 10,404,636 | B2 * | 9/2019 | Rodriguez | H04L 51/04 |
| 10,764,157 | B2 * | 9/2020 | Jeon | H04L 12/2816 |
| 11,082,375 | B2 * | 8/2021 | Peuc | H04L 51/08 |
| 11,082,486 | B1 * | 8/2021 | Brevoort | H04L 51/216 |
| 11,388,120 | B2 * | 7/2022 | Cohen | H04L 51/046 |
| 11,451,499 | B2 * | 9/2022 | Rodriguez | H04L 51/04 |
| 2011/0276396 | A1 * | 11/2011 | Rathod | G06Q 20/10 707/706 |
| 2014/0047028 | A1 * | 2/2014 | Buth | G06F 9/546 709/204 |
| 2017/0134316 | A1 * | 5/2017 | Cohen | H04L 51/216 |

(Continued)

FOREIGN PATENT DOCUMENTS

CA    2667036 A1 * 11/2010  ............. G06Q 10/06

OTHER PUBLICATIONS

"Die, Email, Die! A Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

(Continued)

*Primary Examiner* — Anthony Mejia
(74) *Attorney, Agent, or Firm* — Erise IP, P.A.

(57) ABSTRACT

Systems, methods, and computer-readable media are provided for managing trigger visibility within a group-based communication system where visibility to a trigger may be determined by one or more trigger visibility parameters including a user parameter associated with one or more users and a resource parameter associated with a specific resource or context within the group-based communication system. If a trigger is determined to be visible, based on the trigger visibility parameters, the trigger is included within the group-based communication system such that the trigger and a corresponding workflow are accessible.

20 Claims, 7 Drawing Sheets

(56) References Cited

U.S. PATENT DOCUMENTS

| | | | |
|---|---|---|---|
| 2018/0287982 A1 | 10/2018 | Draeger et al. | |
| 2019/0324893 A1* | 10/2019 | Vaishnav | ............ G06F 11/3664 |
| 2021/0342785 A1* | 11/2021 | Mann | ...................... G06F 40/18 |

OTHER PUBLICATIONS

"How Slack changed the way we work by putting the customer experience first", Repeat Customer Podcast, Episode 3, [online][retrieved May 9, 2019], Retrieved from the Internet: <URL: https://www.zendesk.com/resources/slack-customer-experience/, (2019) 13 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

David Auberbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Ernie Smith, "Picking Up The Slack", Tedium, [online][retrieved May 9, 2019]. Retrieved from the Internet: <URL: https://tedium.co/2017/10/17/irc-vs-slack-chat-history/>. (dated Oct. 17, 2017) 13 pages.

Internet Relay Chat, Wikipedia, [online][retrieved May 30, 2019]. Retrieved from the Internet: <URL: https://en.wikipedia.org/wiki/Internet_Relay_Chat>. (dated May 28, 2019) 20 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Matsumoto, T. et al., "Chocoa Communicator—A New Communication System Based on Awareness and Text Communications—", Fujitsu Sci. Tech. J., 36, 2, (Dec. 2000) 154-161.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Mike Issac, "Slack, a Start-Up With an App to Foster Business Collaboration, Is Valued at $1.1 Billion", The New York Times Blogs (BITS), Lexisnexis, https://advance.lexis.com/api/permalink/3eb84b34-a8f9-4d7d-9573-89d9598a4963/?context=1000516>. (dated Oct. 31, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 57 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

* cited by examiner

EVENT TRIGGER VISIBILITY WITHIN A GROUP-BASED COMMUNICATION SYSTEM

TECHNICAL FIELD

Embodiments of the invention relate to event triggers within a group-based communication system. More specifically, embodiments of the invention relate to managing the visibility of event triggers within a group-based communication system.

Trigger events have been used to initiate processes such as automated workflows within communication environments such as a group-based communication system. However, there is currently no way to contextually manage visibility to the trigger definitions and the corresponding workflow that is initiated. Accordingly, access to triggers and workflows cannot be determined on a user-to-user basis, such that it becomes difficult to personalize triggers to a specific user's needs. Further, triggers cannot be associated with a specific resource or context within the communication environment. Thus, customized triggers may not be reusable or limited for use for a particular audience due to the audience not being configurable for each trigger definition. Accordingly, what is needed is a way to manage trigger visibility based on user parameters and context parameters.

SUMMARY

Embodiments of the invention solve the above-mentioned problems by providing systems, methods, and computer-readable media for managing trigger visibility within a group-based communication system. In some embodiments, visibility to a trigger may be determined by one or more trigger visibility parameters including a user parameter associated with one or more users and a resource parameter associated with a specific resource or context within the group-based communication system. In some embodiments, if a trigger is determined not to be accessible, based on the trigger visibility parameters, the trigger may be suppressed within the group-based communication system such that the trigger and a corresponding workflow are no longer accessible to a given user within a given context.

A first embodiment of the invention is directed to one or more computer-readable media storing computer-executable instructions that, when executed by a processor, perform a method of managing trigger visibility within a group-based communication system, the method comprising receiving, via a user interface, a trigger definition for a trigger including a set of matching events and a set of trigger visibility parameters, the set of trigger visibility parameters configured to define visibility of the trigger within the group-based communication system, accessing a set of available triggers and determining whether to include the trigger in the set of available triggers based on the set of trigger visibility parameters, and responsive to determining that one or more criteria associated with the set of trigger visibility parameters are satisfied, adding the trigger to the set of available triggers based on the set of trigger visibility parameters.

A second embodiment of the invention is directed to a method of managing trigger visibility within a group-based communication system, the method comprising receiving, via a user interface, a trigger definition for a trigger including a set of matching events and a set of trigger visibility parameters, the set of trigger visibility parameters configured to define visibility of the trigger within the group-based communication system, accessing a set of available triggers and determining whether to include the trigger in the set of available triggers based on the set of trigger visibility parameters, and responsive to determining that one or more criteria associated with the set of trigger visibility parameters are satisfied, adding the trigger to the set of available triggers based on the set of trigger visibility parameters.

A third embodiment of the invention is directed to a system for managing trigger visibility within a group-based communication system, the system comprising a data store associated with the group-based communication system, and a processor programmed to perform a method of managing trigger visibility within the group-based communication system, the method comprising receiving, via a user interface, a trigger definition for a trigger including a set of matching events and a set of trigger visibility parameters, the set of trigger visibility parameters configured to define visibility of the trigger within the group-based communication system, accessing a set of available triggers and determining whether to include the trigger in the set of available triggers based on the set of trigger visibility parameters, and responsive to determining that one or more criteria associated with the set of trigger visibility parameters are satisfied, adding the trigger to the set of available triggers based on the set of trigger visibility parameters.

A fourth embodiment of the invention is directed to one or more computer-readable media storing computer-executable instructions that, when executed by a processor, perform a method of managing trigger visibility within a group-based communication system, the method comprising responsive to a user input, updating a set of visibility permissions defining visibility for a trigger configured to initiate an automated workflow within the group-based communication system, the set of visibility permissions comprising at least a user visibility permission defining one or more users who have access to the trigger and a resource visibility permission mapping the trigger to one or more resources of the group-based communication system, responsive to a triggering event, receiving event information including a user identifier and a resource identifier for the triggering event, determining whether the user identifier and the resource identifier of the triggering event are included in the set of visibility permissions, and responsive to determining that the user identifier and the resource identifier are included in the set of visibility permissions, initiating the automated workflow.

Additional embodiments of the invention are directed to a machine learning model for determining one or more suggested triggers for a user based on user activity within a group-based communication system, wherein the machine learning model is trained using historic user data associated with the group-based communication system. In some such embodiments, the training of the machine learning model may be updated periodically based on use of triggers and automated workflows within the group-based communication system such that the accuracy of the suggestions improves over time.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

The drawing figures do not limit the invention to the specific embodiments disclosed and described herein. The drawings are not necessarily to scale, emphasis instead being placed upon clearly illustrating the principles of the invention.

DETAILED DESCRIPTION

Context and Concepts of the Invention

As used herein, the term "group-based communication system" refers to a collaborative communication system used within an organization and is distinct from a conventional email or SMS messaging system. In some embodiments, the group-based communication system is a channel-based messaging platform. Within the group-based communication system, communication may be organized into "channels," each dedicated to a particular topic or set of users. Channels are generally long-lasting, persistent discussions of a particular topic. Members of a particular channel can post messages within that channel that are visible to other members of that channel together with other messages in that channel. Users may select a channel for viewing in order to see only those messages relevant to the topic of that channel without seeing messages posted in other channels on different topics. For example, a software development company may have different channels for each software product being developed, where developers working on each particular project can converse without bothering (or being bothered by) developers working on other projects. Because the channels are generally persistent and directed to a particular topic or group, users can quickly and easily refer back to previous communications for reference.

Communication data within a group-based communication system may include messages, queries, files (e.g., documents, spreadsheets, computer code, images, video, audio, and/or electronic contact information), mentions, users or user profiles, interactions (e.g., reactions, edits, deletions, and/or prioritizations such as by pinning or starring), tickets, channels, applications integrated into one or more channels, conversations (e.g., groups of messages that have been segmented as single units), workspaces (e.g., sets of channels, users, projects, tasks within an organization that may have their own sets of permissions and that may be organized substantially in line with an organization chart in some instances) or other data generated by or shared between users of the group-based communication system that are associated with an organization's communication data using the group-based communication system.

In some instances, the communication data may comprise data associated with a user (e.g., a user profile), including, but not limited to, a user identifier, one or more communication channel identifiers associated with communication channels to which the user has been granted access, one or more group identifiers for groups (or organizations, teams, entities, or the like) with which the user is associated, an indication of whether the user is an owner or manager of any communication channels, an indication of whether the user has any communication channel restrictions, a plurality of messages, a plurality of emoji, a plurality of conversations, a plurality of conversation topics, an avatar, an email address, a real name (e.g., Austin Author), a username (e.g., austin_a), a password, a job title, a skill set, user preferences and/or settings, a time zone, a status, a token, and other user-specific information. In some embodiments, the group-based communication system may additionally or alternatively store permissions data associated with permissions of individual users of the group-based communication system. In some embodiments, permissions associated with an individual user can be mapped to, or otherwise associated with, an account or profile associated with user data. Permissions can indicate which users can communicate directly with other users, which channels a user is permitted to access, restrictions on individual channels, which workspaces the user is permitted to access, and restrictions on individual workspaces, for example. In some embodiments, the permissions can support the group-based communication system by maintaining security for limiting access to a defined group of users. In some such embodiments, such users can be defined by common access credentials, group identifiers, or other criteria, as described above.

In some embodiments, the group-based communication system can be partitioned into different workspaces, which can be associated with different groups of users. Each workspace can be associated with a group identifier and one or more user identifiers can be mapped to, or otherwise associated with, the group identifier. Users corresponding to such user identifiers may be referred to as "members" of the group. A workspace may comprise one or more channels that are unique to that workspace and/or one or more channels that are shared between one or more workspaces. In some embodiments, workspaces can be associated with one or more organization identifiers, which can be associated with organizations or other entities associated with the group-based communication system. In some embodiments, such data can be mapped to, or otherwise associated with, other types of data (e.g., user data, permission data, or channel data).

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments but is not necessarily included. Thus, the technology can include a variety of combinations and/or integrations of the embodiments described herein.

Operational Environment for Embodiments of the Invention

Figure 1A:
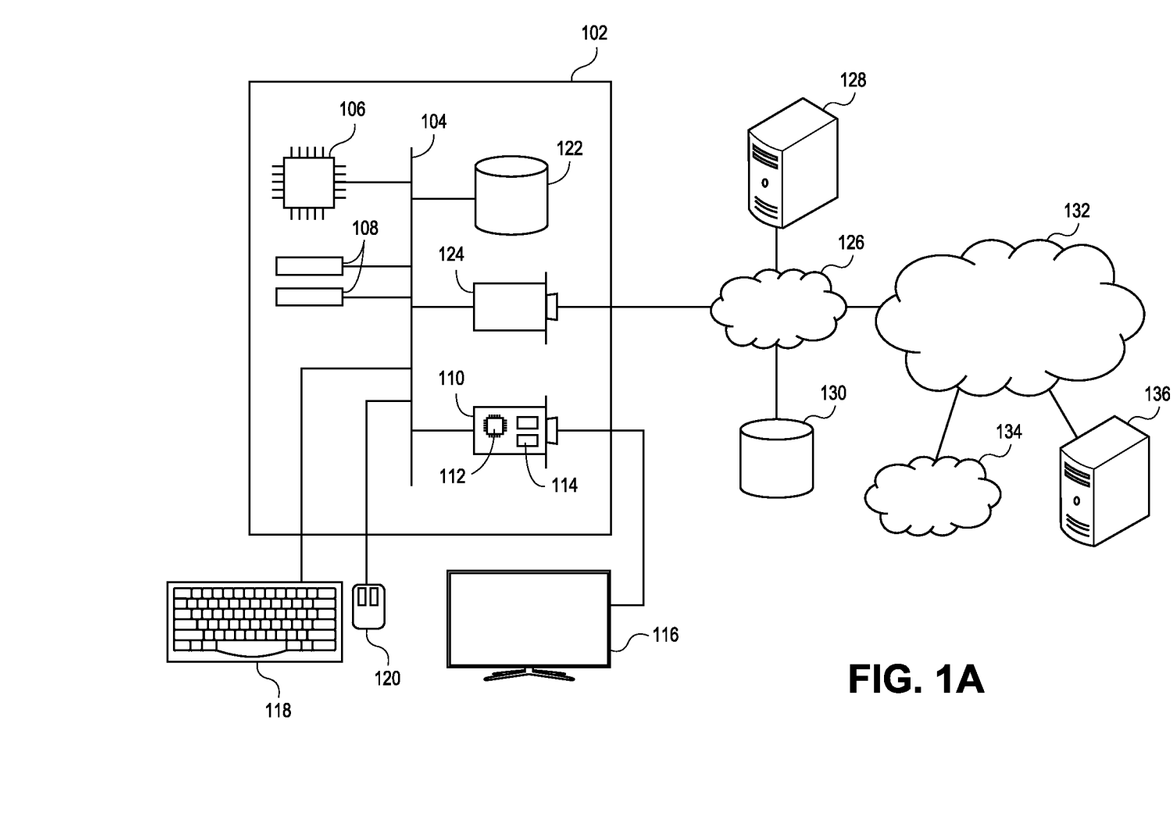
FIG. 1A depicts an exemplary hardware platform relating to certain embodiments of the invention.

FIG. 1A illustrates an exemplary hardware platform for certain embodiments of the invention. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses, or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments, no display is present, while in others it is integrated into computer 102. Similarly, peripherals such as keyboard 118 and mouse 120 are connected to system bus 104. Like display 116, these peripherals may be integrated into computer 102 or absent. In some embodiments, additional peripherals such as a microphone or video camera may also be present and connected to system bus 104. In some embodiments, such peripherals may be detachable connected to computer 102 via a wired or wireless connection. In other embodiments, such as a tablet or smartphone, these peripherals are integrated into computer 102. Also connected to system bus 104 is local storage 122, which may be any form of computer-readable media, and may be internally installed in computer 102 or externally and removably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functionality for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 1B:
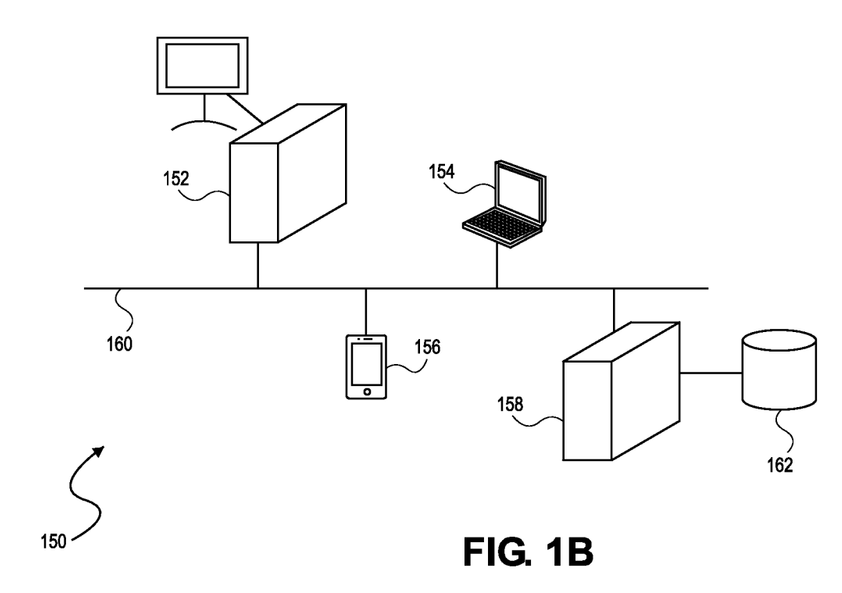
FIG. 1B depicts a system figure including elements for carrying out certain embodiments of the invention.

FIG. 1B shows a system figure including elements of a system 150 for carrying out certain embodiments of the invention. The system 150 comprises any number of client devices, such as client device 152, client device 154, and client device 156. As depicted in FIG. 1B, client devices may be any of a desktop computer, a laptop computer, a mobile phone, a tablet, or any other device suitable to allow a user to access the group-based communication system. The user may also switch from one client device to another, and may access the group-based communication system via multiple devices simultaneously. The group-based communication system may be accessible via dedicated software of the client device or via the web browser of the client device. In some embodiments, channel administrators can access administrative functionality via any client device. In other embodiments, administrative functions can only be accessed from a limited subset of client devices (for example, only via client device 152). In some examples, the group-based communication system is a channel-based messaging platform having a plurality of messaging channels available to select users.

The system further comprises a group-based communication system server 158 that acts as a host for the group-based communication system. The group-based communication system server 158 may be a dedicated server, a shared server, or any other form of computing device discussed above with respect to FIG. 1A. Although a single group-based communication system server 158 is depicted, embodiments with multiple such group-based communication system servers are also contemplated so as to provide scale, redundancy and/or isolation between different instances of the group-based communication system. For example, a particular organization that uses the group-based communication system may not wish to have its group-based communications system hosted on the same server as a competitor's group-based communication system for security reasons. Group-based communication server 158 is communicatively coupled to client devices 152, 154, and 156 via network 160. Network 160 may be a local area network (LAN), wide-area network (WAN), virtual private network (VPN) or the Internet. Broadly speaking, any type of network for providing communication between the various components of system 150 is contemplated. Group-based communication system server 158 may provide web server functionality to enable web-based clients and non-web server functionality to enable clients using a dedicated app. Alternatively, both web-based clients and dedicated-app clients might both use a single web server, or the web server might be a gateway providing web-based access to the dedicated-app server. Other techniques for enabling communication among various types of client applications are also contemplated.

It should be understood that the group-based communication system as referred to herein may provide a communication platform for a plurality of users. Wherein each user may be associated with a specific organization. Said specific organization may be a small business, a corporation, or the like, as well as any other group of users. The group-based communication system is operable to provide communication services to any combination of users. For example, in some embodiments, communication services can be provided for a plurality of users from a single organization, as well as a plurality of users from a plurality of organizations. In some embodiments, a plurality of channels is present within the group-based communication system. Users may be added to each channel, such that users within the channel have access to messages and files posted within the channel. Further, users within the channel have the ability to post messages and upload files within the channel. In some embodiments, users may be added to a particular channel by an administrator, such as an administrator within a particular organization. Alternatively, in some embodiments, users may be added by any user within the channel. Further, in some embodiments, channel parameters such as who can add users may be set by the channel creator. For example, channels created by a particular organization may follow that organization's security policy, in which only administrators can add users to certain channels.

Group-based communication system data store 162 is communicatively connected to group-based communication system server 158. As depicted, group-based communication system data store 162 is directly connected to group-based communication system server 158; however, any form of communicative connection (for example, network-attached storage (NAS), a network file system (NFS), or cloud-based storage) can be employed. Broadly speaking, group-based communication system data store 162 stores all of the information used by group-based communication system server 158. For example, group-based communication system data store 162 may store all of the messages with their associated channels, documents and images uploaded to particular channels, channel membership information, and/or user information. As previously discussed, multiple group-based communication system servers may be present in system 150. In such embodiments, each group-based communication system server may have its own copy of group-based communication system data store 162. Alternatively, multiple group-based communication system servers may share a single network-attached group-based communication system data store. Alternatively, or in addition, in any of these embodiments, data may be sharded across multiple group-based communication system data stores.

It should be understood that any of the client devices 152, 154, and 156, and the group-based communication system server 158 may comprise a processor, such as CPU 106 described with respect to FIG. 1A. Any of the functionality described herein with respect to a processor may be carried out by the processors within any of these devices. In some embodiments, for example, a processor within the group-based communication system server may perform a first process step, while a processor within the client device performs a second process step.

Figure 2:
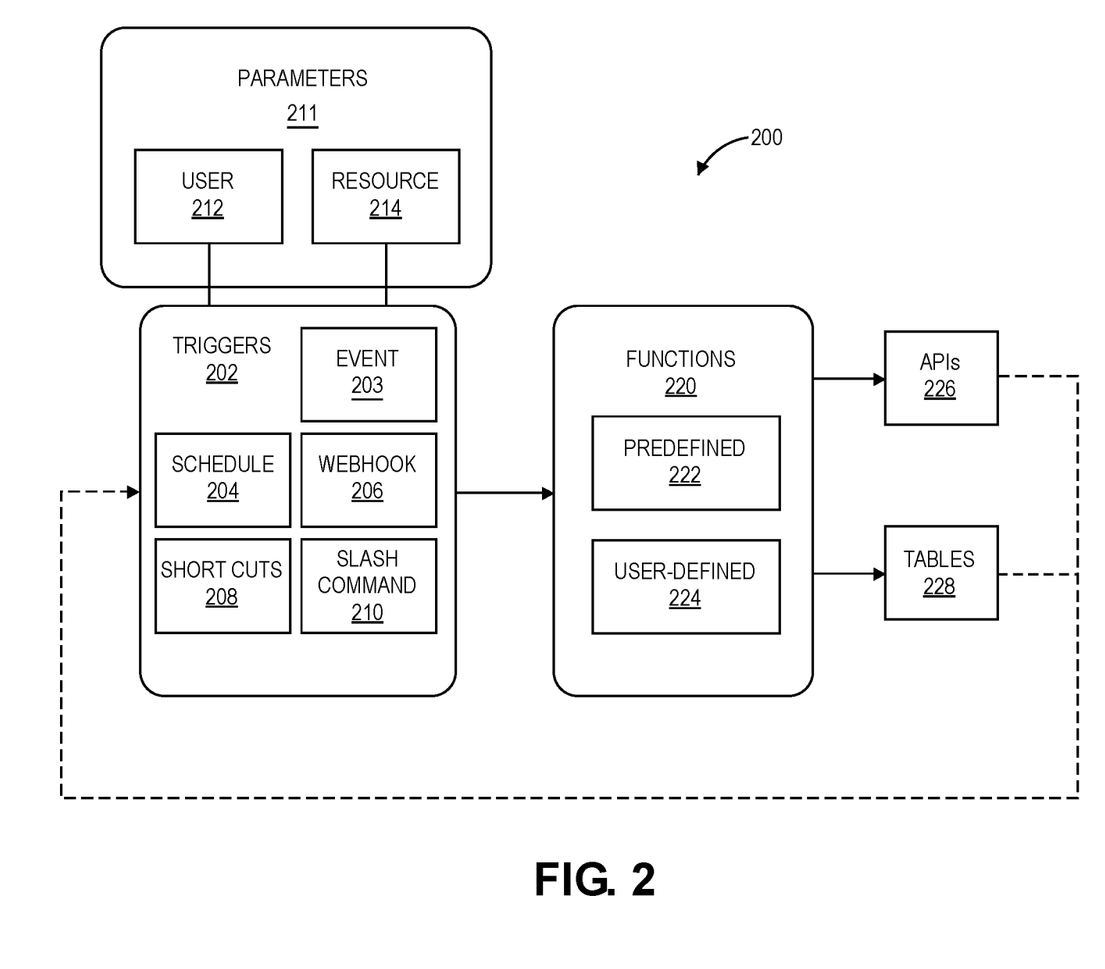
FIG. 2 depicts a block diagram illustrating interrelationships between certain elements employed in some embodiments of the invention.

FIG. 2 depicts a block diagram 200 illustrating interrelationships between certain elements employed in some embodiments of the invention. In various embodiments, triggers 202 are configured to trigger execution of a function 220. A trigger initiates application execution and may take the form of a schedule 204, a webhook 206, a shortcut 208, or a slash command 210. In some embodiments, other types of triggers are also contemplated. In some embodiments, a given trigger 202 may be associated with a triggering event 203 which may be an event that takes place within the group-based communication system, such as for example, a user posting or reacting to a message in a channel, a new user joining a channel, or another group-based communication system event. Further, in some embodiments, triggering events may be associated with external sources, as will be described in further detail below.

In some embodiments, schedule 204 operates like a timer so that a trigger may be scheduled to fire periodically. In some embodiments, an end user of an event-based application sets an arbitrary one-time or repeating schedule for the firing of a trigger, such as once-an-hour or every day at 9:15 AM. Additionally, triggers 202 may take the form of webhook 206. Webhook 206 is a software component that listens at a webhook URL and port. In some embodiments, a trigger fires when an appropriate HTTP request is received at the webhook URL and port. In some embodiments, webhook 206 requires proper authentication such as by way of a bearer token. In some embodiments, a payload associated with a particular webhook invocation will contain information to be processed at the webhook prior to causing any trigger to be fired. In some embodiments, one of the triggers 202 will fire any time webhook 206 is invoked and some or all of the payload associated with a particular webhook invocation will be passed on to one or more of functions 220. In some other embodiments, triggering will be dependent on payload content.

Another source of triggers 202 is shortcuts 208 associated with a group-based communication system. In some embodiments, shortcuts 208 are global to a group-based communication system or specific to a group-based communication system channel or other context. Global shortcuts are not specific to a group-based communication system channel or workspace. Global shortcuts may be initiated from a shortcuts button in a group-based communication message composer or from within a search interface associated with the group-based communication system client interface. Global shortcuts may trigger functions that are able to execute without the context of a particular group-based communication system message or group-based communication channel. By contrast, message-based, channel-based, or other context-specific shortcuts are specific to a particular group-based communication system context and operate in that context (such as, for example, in the context of that group-based communication system message or group-based communication channel).

A further source of one of triggers 202 may be provided by way of slash commands 210. Slash commands 210 may serve as entry points for group-based communication system functions, integrations with external services, or group-based communication system message responses. In some embodiments, slash commands 210 may be entered by a user of a group-based communication system in order to trigger execution of particular application functionality. A particular slash command may be entered by a user of the group-based communication system directly into a user input component ordinarily used to input group-based communication system messages. In some embodiments, slash commands 210 are distinguishable from a group-based communication system message in that they are preceded by a forward slash ('/'). Slash commands may be followed by slash-command-line parameters which may be passed along to any group-based communication system function that is invoked in connection with the triggering of a group-based communication system function such as one of functions 220.

It should be understood that in some embodiments, the triggers 202 may be used to initiate execution of a function or workflow within the group-based communication system. Further, in some embodiments, the triggers 202 may initiate a function or workflow within an external application, for example, to retrieve data, update a table entry, send a message, or to perform a variety of other external functions not explicitly described herein. In some embodiments, a plurality of distinct functions may be carried out as a single automated workflow where successful completion of a first function initiates one or more subsequent functions. Here, a workflow may comprise an ordered list of functions to be executed such that a variety of complex operations may be carried out within the group-based communication system or within an external application.

In some embodiments, each of the triggers 202 may be associated with a set of trigger visibility parameters 211. For example, trigger visibility parameters 211 may include a user parameter 212 and a resource parameter 214, as shown. Here, the trigger visibility parameters 211 may determine visibility and accessibility of the triggers 202 within the group-based communication system. In some embodiments, the trigger visibility parameters 211 may define a set of permissions for the trigger for determining who can view the trigger and where the trigger can be accessed based on a context of the group-based communication system. In some embodiments, the user parameter 212 may be associated with one or more users of the group-based communication system. For example, the user parameter 212 may define one or more user indicators relating to users of the group-based communication system who should be able to view and access the trigger. Accordingly, the user parameter 212 may set visibility of a trigger to a predefined user or set of users. In some embodiments, the visibility may be determined based at least in part on one or more user parameters such as a user role or a user group. For example, in some embodiments, users of the group-based communication system may be assigned to user roles, such as an administrator or channel moderator. Accordingly, a user parameter 212 may be defined for a specific user role such that only users assigned to that role have access to the trigger. Alternatively, or additionally, in some embodiments, user parameters 212 may be defined that prevent specific users or roles from accessing a trigger. For example, in some embodiments, it may be desirable to define who cannot access a trigger rather than who can access the trigger.

The resource parameter 214 may be associated with one or more resources within the group-based communication system. In some embodiments, the resource parameter 214 may define one or more resources of the group-based communication system associated with the trigger. For example, in some embodiments, the resource parameter 214 may define a resource identifier such as a channel name for a specific group-based communication channel of the group-based communication system. In some embodiments, the resource parameter 214 may also be associated with other group-based communication resources such as workspaces, organizations, emojis, reactions, or specific communication threads. Accordingly, the resource parameter 214 may restrict access of a trigger to the one or more channels or other resources. For example, a user may set a resource parameter 214 restricting access of a given trigger for a workflow to a single channel such that the trigger only fires within that channel and the workflow can only be initiated from within that channel. Similar to the user parameter 212, in some embodiments, the resource parameter 214 may be defined such that it prevents access to the trigger within one or more channels.

In some embodiments, a given workflow may comprise one or more functions 220. In some embodiments, the functions 220 may be either predefined functions 222 or user-defined functions 224, as shown. In such embodiments, the predefined functions 222 may include default functions preconfigured in the group-based communication system. The user-defined functions 224 may be configured by users of the group-based communication system, for example, using a builder tool or an advanced developer tool. In some embodiments, predefined functions 222 or previously configured user-defined functions 224 may be used as templates for users to configure additional functions by tweaking parameters of existing functions. For example, a first user may configure a first function for performing a specific task within the group-based communication system and a second user may use the first function as a template to configure a second function which is slightly different from the first function. In some such embodiments, the functions or workflows may be tweaked by changing the trigger visibility parameters 211. For example, a user may copy a workflow from another user, adjust the trigger visibility parameters 211, and use the copied workflow.

In some embodiments, the functions 220 may interface with one or more application programming interfaces (APIs) 226 or tables 228. For example, in some embodiments, the functions 220 may utilize APIs 226 to communicate with one or more external applications. Further, the functions 220 may utilize tables 228 to edit and/or store data entries in an organized manner. For example, a given function may be configured to automatically update a table of user data whenever additional user data is received within the group-based communication system. In some embodiments, either of the APIs 226 or the tables 228 may interface with the triggers 202. For example, in some embodiments, triggers may fire in response to an API communication or table entry.

In some embodiments, APIs 226 are associated with third-party services that functions 220 employ to provide a custom integration between a particular third-party service and a group-based communication system. Examples of third-party service integrations include video conferencing, sales, marketing, customer service, project management, and engineering application integration. In such an example one of the triggers 202 could be a slash command 210 that is used to trigger a "hosted" function, which makes an API call to a third-party video conferencing provider by way of one of the integrated APIs 226. Here, the APIs 226 may themselves also become a source of one or more triggers 202. In this example, successful completion of a video conference could trigger one of the functions 220 that sends a message initiating a further API call to the third-party video conference provider to download and archive a recording of the video conference and store it in a group-based communication system channel.

In addition to integrating with APIs 226, functions 220 may persist and access data in tables 228. In some embodiments, tables 228 are implemented in connection with a database environment associated with a serverless execution environment in which a particular event-based application is executing. In one embodiment, tables 228 may be provided in connection with a relational database environment. In other embodiments, tables 228 are provided in connection with a database mechanism that does not employ relational database techniques. In some embodiments, reading or writing certain data to one or more of tables 228, or data in table matching predefined conditions is itself a source of one or more triggers 202 or triggering events. For example, if tables 228 are used to maintain ticketing data in an incident-management system, then a count of open tickets exceeding a predetermined threshold may trigger a message being posted in an incident-management channel in the group-based communication system.

Figure 3A:
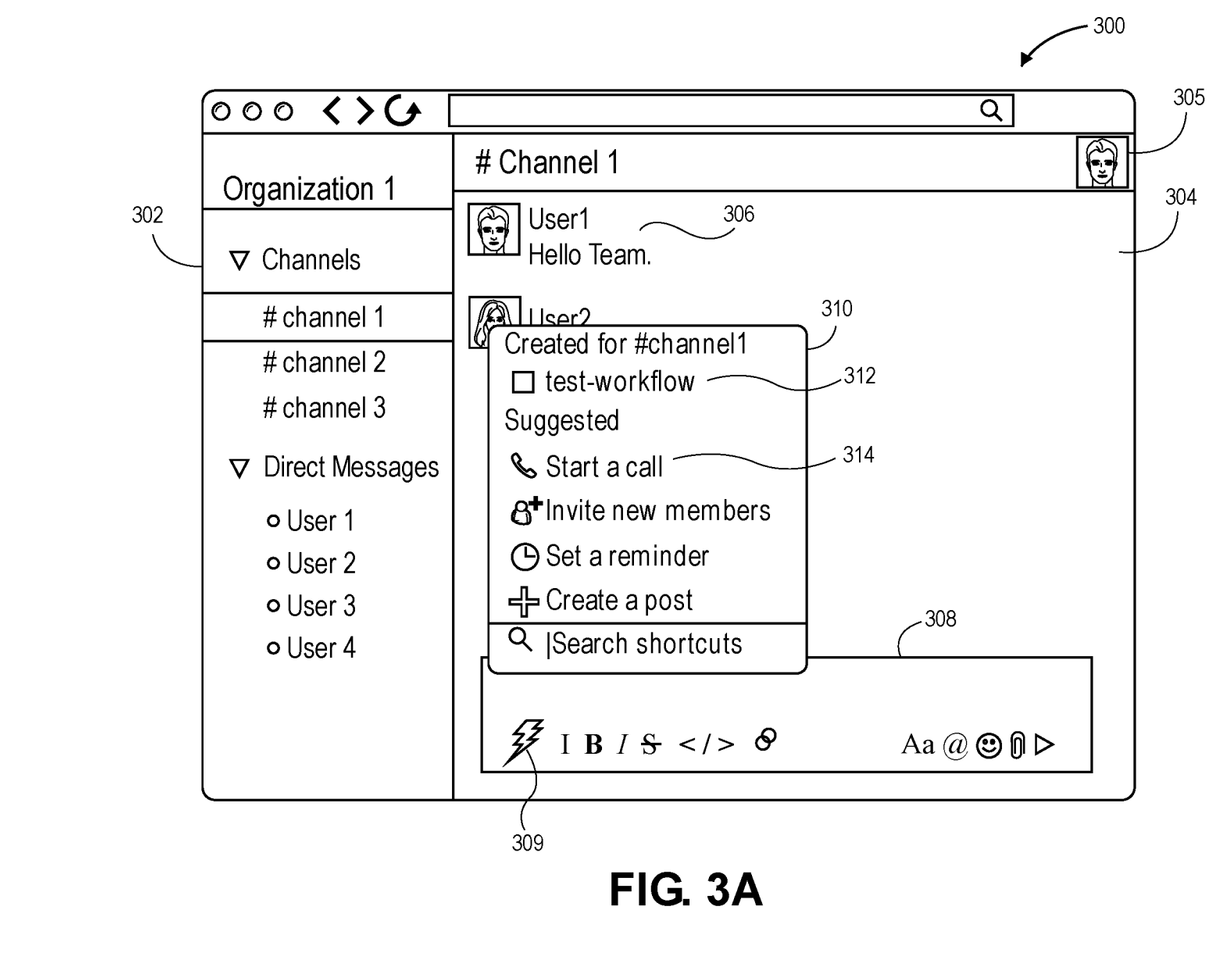
FIG. 3A depicts a group-based communication interface relating to some embodiments of the invention.

FIG. 3A shows an exemplary group-based communication interface relating to some embodiments of the invention. In some embodiments, the group-based communication interface is associated with the group-based communication system and may be displayed as part of a graphical user interface. For example, in some embodiments, the group-based communication interface 300 may be generated for display on a user device of a user associated with the group-based communication system. Accordingly, embodiments are contemplated in which the group-based communication interface 300 is accessed from either of a mobile device such as a smartphone, tablet, or laptop, or a stationary device such as a desktop computer, as well as any other suitable user device.

In some embodiments, the group-based communication interface 300 includes a sidebar pane 302 and a communication pane 304. The sidebar pane 302 may include a list of one or more selectable group-based communication channels of the group-based communication system. Here, each group-based communication channel may provide a communications environment for members of the respective channel to post messages, read messages, and share multimedia content such as files, videos, images, and other types of media. The group-based communication channels may be public channels, private channels, shared channels, or other suitable types of communication channels. Additionally, included in the sidebar pane 302 may be one or more direct message communication channels which a user may select to communicate with one or more other users directly.

Figure 3B:
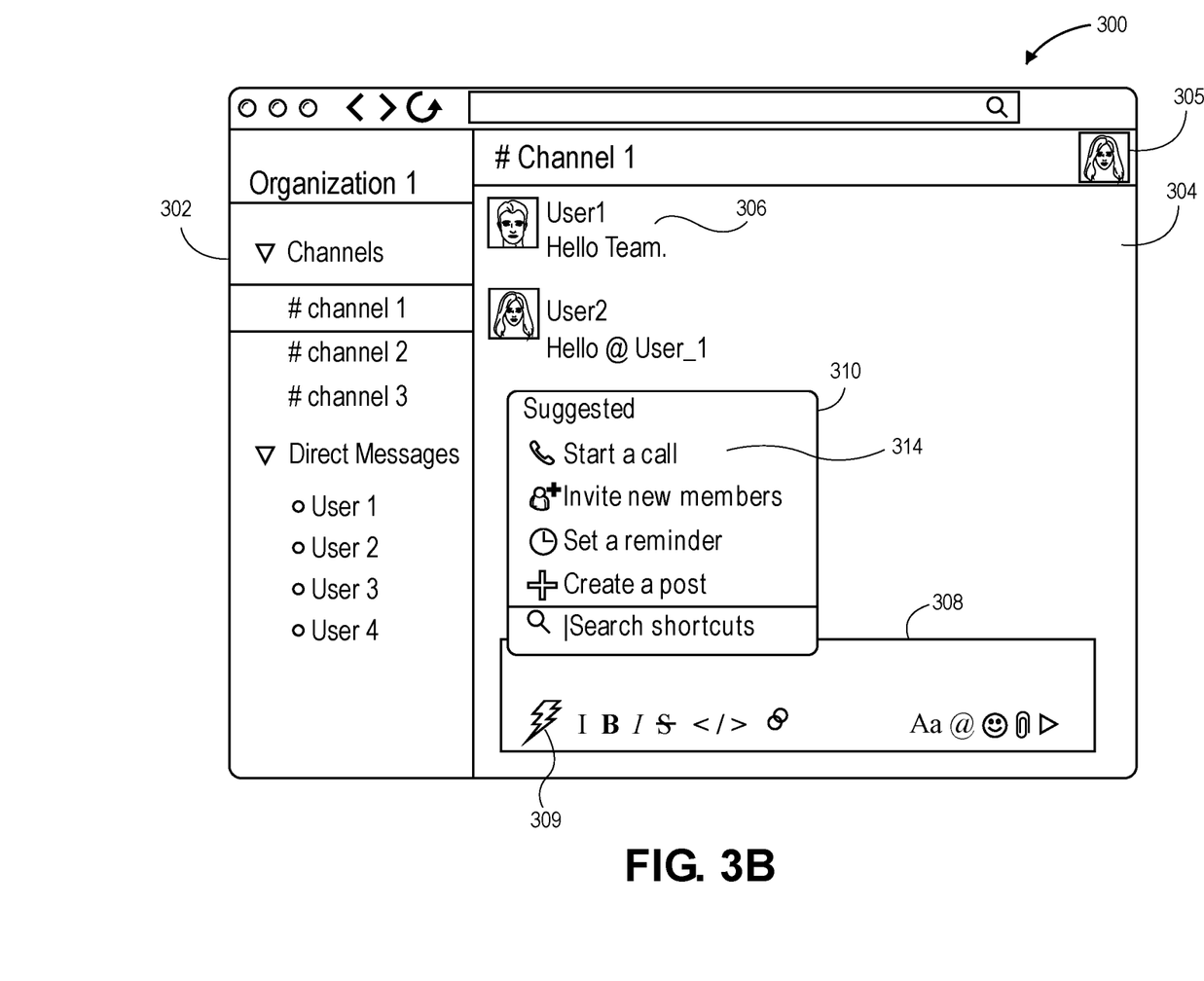
FIG. 3B depicts a group-based communication interface relating to some embodiments of the invention.

The communication pane 304 may be accessed for a given channel by selecting the channel from the sidebar pane 302 and provides a presentation of the communication environment associated with the channel. Accordingly, the communication pane 304 may include one or more messaging communications 306 posted by channel members, as shown. In some embodiments, the group-based communication interface 300 further includes a user indicator 305 showing what user is signed-in to the group-based communication interface 300. The user indicator 305 may include any combination of a user image selected by the user, a username, or other user information. In one example, if a first user is signed-in to the group-based communication system, a user image for the first user will be included in the user indicator 305, as shown. Alternatively, if a second user is signed-in, a user image for the second user will be included, as shown in FIG. 3B.

Additionally, the group-based communication interface 300 may include a communication input field 308 for composing messages to be posted in the group-based communication channel. It should be understood that in some embodiments, the messages may include multimedia content such as any combination of text content, files, image content, video content, and audio content. For example, a user may choose to attach one or more files to a text message composed using the communication input field 308 and post the message within the group-based communication channel to be displayed in the communication pane 304. Further, in some embodiments, the communication input field 308 may be used to input one or more slash commands. For example, a user may type a slash symbol to initiate a slash command. In some embodiments, an auto-complete function may suggest one or more slash commands responsive to the user typing the slash symbol. Additionally, in some embodiments, the slash commands may be suggested and presented to the user based at least in part on the trigger visibility parameters 211 such as the user parameter 212 and the resource parameter 214.

In some embodiments, the group-based communication interface 300 may further comprise a shortcut interface object 309 which may be included as part of the communication input field 308, as shown. In some embodiments, the shortcut interface object 309 may be selected to initiate a shortcut selection menu 310, which may be presented in the graphical user interface in front of the communication pane 304, as shown. In some embodiments, the shortcut selection menu 310 may include one or more channel-specific shortcuts 312 and one or more suggested shortcuts 314, as shown. In some embodiments, the channel-specific shortcuts 312 that are included in the shortcut selection menu 310 may be determined based on one or more trigger visibility parameters 211 such as the user parameter 212 and the resource parameter 214. For example, a given shortcut trigger may be configured to be accessible only within a first channel to a specific user such that the shortcut trigger only appears to that user and only within the first channel.

In some embodiments, it should be understood that the group-based communication interface 300 may be presented differently to different users of the group-based communication system. For example, the group-based communication interface 300, as shown in FIG. 3A may be generated for display for a first user signed-in to their account within the group-based communication system while the group-based communication interface 300 may be modified when displayed to a subsequent user, as will be described in further detail below with respect to FIG. 3B. Here, the first user may be signed-in to a first user account associated with a first user identifier identifying the first user within the group-based communication system.

FIG. 3B shows the exemplary group-based communication interface 300 relating to some embodiments of the invention for a subsequent user of the group-based communication system. Here, a second user may be signed-in to the group-based communication system on a second user account with a second user identifier such that the user indicator 305 shows the second user, as shown. Here, the group-based communication interface 300 may still include the channel selection pane 302, the communication pane 304 and the communication input field 308. Further, the group-based communication interface 300 may include the shortcut interface object 309 which may be selected to present the shortcut selection menu 310. However, the shortcuts which are accessible and visible within the shortcut selection menu 310 may be modified based on the user who is signed-in to the group-based communication system. In some embodiments, the shortcuts which appear may be further modified based on the context such as the group-based communication channel or workspace. For example, since the second user is signed-in at least one trigger may not be visible based on the trigger visibility parameters 211 such as the user parameter 212.

In some embodiments, one or more of the channel-specific shortcuts 312 or the suggested shortcuts 314 may be suppressed such based at least in part on the user parameter 212 and the resource parameter 214 that they do not appear in the shortcut selection menu 310. It should be understood that other types of triggers may be suppressed within the group-based communication system. For example, slash command triggers or any other type of trigger may be suppressed based on the trigger visibility parameters 211. Accordingly, in some embodiments, a trigger may be suppressed from a set of available triggers based on the resource parameter 214 and the user parameter 212, such as, for example, an accessing context and a user parameter, respectively.

Figure 4:
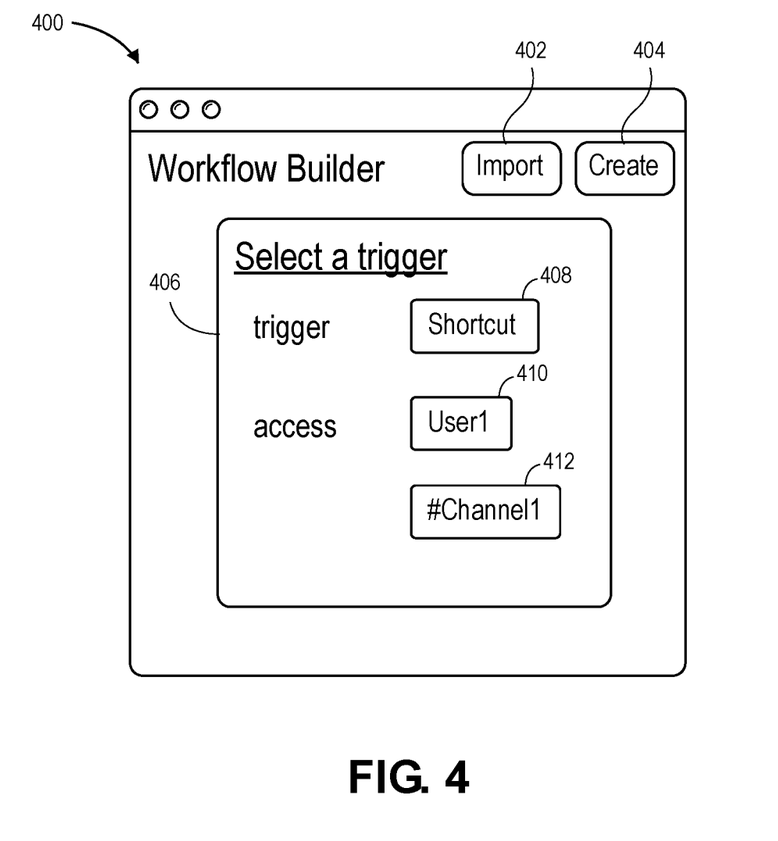
FIG. 4 depicts a builder interface relating to some embodiments of the invention.

FIG. 4 shows an exemplary builder interface 400 relating to some embodiments of the invention. In some such embodiments, the builder interface 400 may be associated with a builder tool of the group-based communication system, such as, for example, a workflow configuration interface associated with a workflow builder tool, as shown, for configuring automated workflows within the group-based communication system. In some embodiments, the builder interface 400 may be generated for display within a graphical user interface on a user device. Further, in some embodiments, the builder interface 400 is accessible from within the group-based communication interface 300.

In some embodiments, the builder interface 400 includes an import interface object 402 for importing a previously defined workflow as a template. Further, the builder interface 400 may include a create interface object 404 for creating a new workflow from scratch. In some embodiments, the builder interface 400 allows the user to configure one or more triggers for a workflow. Accordingly, a trigger selection menu 406 may be presented on the builder interface 400 including a trigger type input field 408 and one or more of a user parameter input field 410 and a resource parameter input field 412, as shown. Here, the trigger type input field 408 may allow the user to select from a set of available trigger types including a schedule, a webhook, a shortcut, and a slash command. In some embodiments, the trigger may be configured independently from the workflow such that a trigger may be connected to a workflow after the workflow is already defined.

The user parameter input field 410 allows the user to select one or more users for which the trigger should be accessible, such that only certain users have access to the trigger and the corresponding workflow. The user parameter input field 410 accepts a user input indicative of one or more user parameters or user parameters. For example, in some embodiments, any combination of user identifiers, user roles, or user groups may be selected in the user parameter input field 410. For example, the builder interface 400 may generate a list of user identifiers, roles, and user groups for a user to choose from or allow the user to type one or more usernames, groups, or roles. Further, in some embodiments, the user parameter input field 410 may allow the user to select an option to include all users, such that all users have access to the trigger. Accordingly, embodiments are contemplated in which visibility may be limited only by the context.

In some embodiments, the resource parameter input field 412 accepts a user input indicative of a resource parameter or contextual parameter. Accordingly, a user may select a specific channel by typing or selecting the channel identifier from a list. Further, in some embodiments, the resource parameter input field 412 allows the user to select from a variety of resources of the group-based communication system for which the trigger should be associated with such as a channel, an organization, and a workspace. Accordingly, the trigger may be contextually applied within the group-based communication system such that the corresponding workflow is only initiated in certain circumstances based on one or more of the context pertaining to a specific user and at least one user parameter. Such a process of assigning trigger visibility parameters 211 to a trigger allows accessibility of the trigger to be distributed granularly based on specific needs and preferences of the users of the group-based communication system.

In one example use case relating to some embodiments of the invention, a first user utilizes the builder interface 400 to define and test a new workflow for use within the group-based communication system. Accordingly, the first user wishes for the test workflow to be accessible only to the first user during testing. Here, the first user sets the trigger type to shortcut and selects their own user identifier as the user parameter such that the test workflow is only accessible by the first user. Further, the first user may restrict access to the test workflow to a first channel such that the test workflow can only be accessed as a shortcut within the first channel. Accordingly, when the first user accesses shortcuts within the first channel the test workflow will appear but will not appear to any other users or within any other channels. Here, the first user may use the visibility parameters to test the workflow before publishing the workflow or sharing with other users. In some embodiments, the builder interface 400 may also allow users to edit existing workflows and triggers. Accordingly, after confirming that the new workflow executes properly, the first user may access the builder interface 400 to edit the trigger parameters, for example, to expand the visibility of the trigger to all users.

The trigger visibility parameters 211, as described herein, may be desirable to debug workflows before expanding trigger visibility. Additionally, visibility parameters may be utilized to limit the range and context of certain functions and workflows within the group-based communication system. For example, if a user finds that a given function is only useful within a first portion of channels but not within a second portion of channels, the user may configure the trigger visibility parameters 211 such that the workflow is only accessible within the first portion of channels. Further, the visibility may be set to reduce certain triggers from saturating the group-based communication system. For example, if a trigger is occurring frequently within the group-based communication system in contexts in which it is not useful the context may be limited to reduce the frequency of the trigger and corresponding workflow.

The trigger visibility parameters 211 may be further useful for expanding the personalization of the workflows and functions within the group-based communication system. For example, a user may configure a workflow to perform a plurality of functions whenever the user is out of the office on a lunch break, such as update the user's status within the group-based communication system and auto-reply to received messages. Accordingly, the user may set the trigger for the workflow as a scheduled trigger such that when the user is away from their desk for more than ten minutes between the hours of 11 am to 1 pm the workflow is triggered. Such a workflow will desirably be only accessible to that user and may not be useful to other users. Additionally, workflows may be slightly changed and tweaked to meet the needs of each individual user. For example, a first user may utilize a first version of a workflow while a second user utilizes a second version of the workflow which is based off of the first version but is edited slightly for the second user. Accordingly, each user may limit visibility of their version of the workflow to themselves.

In some embodiments, trigger visibility parameters 211 for a given workflow may be configured such that the workflows are only triggered for certain user roles. Here, users who are associated with a specific role may have access to the triggers and corresponding workflow. For example, if a first user is associated with an emoji manager role, a specific workflow for managing emojis within the group-based communication system is triggered only for the first user. Further, in some embodiments, triggers may remain even after user roles are updated. For example, if the first user is fired and a second user is promoted to the emoji manager role, the emoji management workflow may be triggered only for the second user. As such, embodiments are contemplated in which the functionality of the group-based communication system may be adjusted based on specific user roles using the configurable trigger visibility parameters 211 to define visibility to specific users and specific contexts.

Embodiments are contemplated in which trigger visibility parameters 211 may be assigned automatically. For example, in some embodiments, a machine learning algorithm such as an artificial neural network may be utilized to determine appropriate visibility of a trigger based on historic training data. For example, in some embodiments, if it is determined that only a single user utilizes a given workflow, accessibility to that workflow may automatically be limited to that user. Conversely, in some embodiments, if it is determined that a given user never uses a workflow, triggers for the workflow may be automatically suppressed for that user. Accordingly, in some embodiments, trigger visibility parameters 211 may be determined automatically based on user activity within the group-based communication system. Further, in some embodiments, a machine learning model may be applied to determine a set of suggested triggers for a user. Here, the suggested triggers may be determined based at least in part on user activity within the group-based communication system. In some embodiments, the training of the machine learning model may be updated periodically based on use of triggers and workflows within the group-based communication system such that the suggestion accuracy of the model improves over time. For example, if a user frequently uses a workflow within a certain context, that workflow may be suggested for that user in that context by the machine learning model. Accordingly, in some embodiments, it may be desirable to provide the machine learning model with training data including event metadata from the group-based communication system such that the context of the triggering event can be identified.

In some embodiments, one or more default trigger visibility parameters 211 may be predefined for a given workflow. In some embodiments, the default trigger visibility parameters 211 may include a set of suggested trigger visibility parameters 211 configured by a user when setting up a workflow. Additionally, in some embodiments, the default trigger visibility parameters 211 may be suggested parameters predefined within the group-based communication system. Accordingly, in some embodiments, the builder interface 400 may be used to update the set of suggested trigger visibility parameters 211 with one or more updated trigger visibility parameters 211 based on a user input. For example, a first user may create a workflow for performing a task in the group-based communication system and set a suggested trigger visibility parameter which restricts the trigger to a particular channel. After publishing the workflow within the group-based communication system, the workflow becomes available to a second user who accesses the workflow from the builder interface 400. Accordingly, the second user may define one or more updated trigger visibility parameters 211, for example, to expand the range of the workflow triggers to another channel where the workflow may be useful.

Additionally, in some embodiments, one or more suggested default trigger visibility parameters 211 may be determined automatically. As such, embodiments are contemplated in which the user parameter 212 may be determined automatically based on the resource parameter 214. For example, if the resource parameter 214 is associated with a channel the user parameter 212 may be automatically set to include all members of the channel, and if the resource parameter 214 is associated with an entire workspace or organization the user parameter 212 may automatically be set to "self" such that only the user who configures the trigger has access to the trigger by default. However, it should be understood that in some embodiments, the user is able to override the suggested default visibility parameters by, for example, redefining the trigger visibility parameters 211 within the builder interface 400.

In some embodiments, users may be automatically prompted to add workflows within the group-based communication system. For example, if it is determined that a pre-existing workflow may be helpful within a specific channel, for example, using a machine learning model, then a user may be prompted to include the workflow. Accordingly, in such embodiments, a default suggested visibility parameter may include a resource parameter 214 associated with the channel such that the workflow is by default only triggerable within that channel. Here, since the suggested trigger visibility parameters 211 are determined automatically the user may not have to manually input the parameters and the context of the workflow is automatically optimized.

Figure 5:
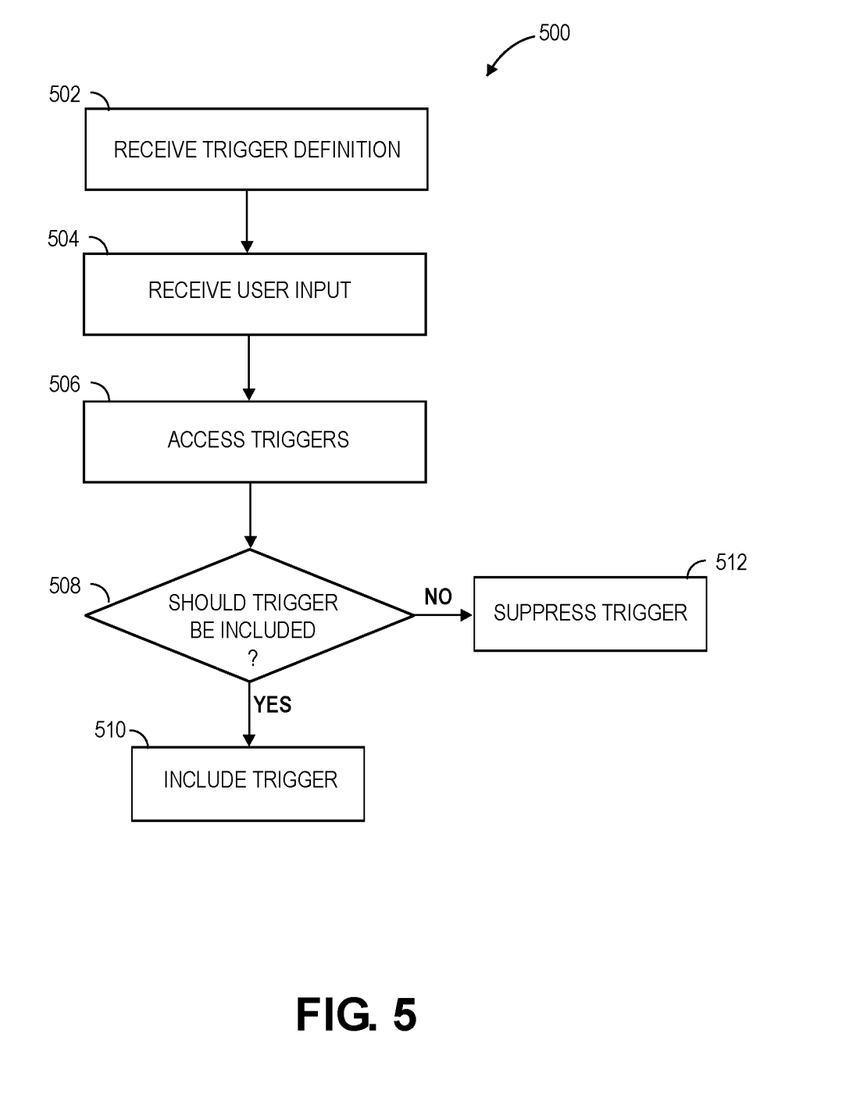
FIG. 5 depicts a method for managing trigger visibility relating to some embodiments of the invention.

FIG. 5 shows an exemplary method 500 for managing trigger visibility within the group-based communication system relating to some embodiments of the invention. In some embodiments, steps of the method 500 may be executed on one or more processors such as CPU 106 or a processor of the group-based communication system server 158. Further, in some embodiments, the processing may be distributed among a plurality of processors, such that a first portion of the steps described herein may be performed on a first processor while a second portion is performed on a second processor.

At step 502 a trigger definition is received. In some embodiments, the trigger definition may be received via a user interface such as the builder interface 400. In some embodiments, the trigger definition includes a user selection of a set of matching events for the trigger and one or more trigger visibility parameters 211 defining visibility of the trigger based on at least one of an accessing context and a user parameter. Here, the set of matching events may correspond to a triggering event and the type of trigger such as a schedule, a webhook, a shortcut, or a slash command. Accordingly, the trigger may be configured to fire if the matching event is satisfied within the group-based communication system provided that the trigger visibility parameters 211 are also satisfied. In some embodiments, the trigger visibility parameters 211 include the user parameter 212 and the resource parameter 214, as described herein. Accordingly, embodiments are contemplated in which a triggering event is received including a user indication and a resource indication. Here, the user indication and resource indication of the event may be compared to the user parameter 212 and the resource parameter 214 of the trigger 202 to determine whether the trigger should be visible, as will be described in further detail below. In some embodiments, the trigger definition may be stored, for example, in the group-based communication system data store 162, such that the trigger definition can be accessed by one or more users who satisfy a criteria of the trigger visibility parameters 211.

At step 504 a user input is received. In some embodiments, the user input may comprise a user action within the group-based communication system. For example, in some embodiments, the user input includes a user selecting the shortcut interface object 309 within the group-based communication interface 300. Further, in some embodiments, the user action may be a user sending a message, reacting to a message, or taking some other action within the group-based communication system. Further still, embodiments are contemplated in which the user action may be received external to the group-based communication system, for example, through an API or webhook.

At step 506 a set of available triggers is accessed. In some embodiments, the triggers may be accessed in response to receiving the user input at step 504. In some embodiments, the available triggers are accessed in association with an event within the group-based communication system, for example, when a user selects the shortcut interface object 309 within the group-based communication interface 300. Accordingly, in this example, the available set of triggers may be accessed for display in the shortcut selection menu 310 whenever a user selects the shortcut interface object 309. However, it should be understood that the set of available triggers may be accessed in a variety of other contexts, for example, from a user typing a slash command within the communication input field 308 of the group-based communication interface 300.

At step 508 it is determined whether the trigger should be included in the set of available triggers based on at least one trigger visibility parameter, such as the accessing context or user parameter. Accordingly, if the accessing context is set according to a specific group-based communication system resource such as a specific channel and the user parameter includes one or more users or user roles the trigger will only be accessible in that channel to those users. In some embodiments, this determination is made by comparing an active context of the group-based communication system with the one or more trigger visibility parameters 211. For example, a current channel identifier and user identifier associated with a triggering event may be compared to a set of channel identifiers and user identifiers which either do or do not have access to the trigger. If it is determined that the trigger should be included the trigger is included in the set of available triggers at step 510. Alternatively, if it is determined that the trigger should not be included, the trigger is suppressed from the set of available triggers at step 512. Accordingly, the set of available triggers may be determined based on the visibility parameters such as a specific user and a specific context of the group-based communication system.

In some embodiments, the determination of whether to include the trigger (or allow access to the trigger) may be made by reviewing event metadata from the group-based communication system. For example, metadata associated with a triggering event or a set of event parameters may be received including a user identifier and some indication of a context for the event, such as a channel identifier. Accordingly, the determination may be made by comparing the event metadata with the set of trigger visibility parameters 211. For example, a user identifier associated with the event may be checked against a list of allowed user identifiers to determine if the user should have access to the trigger. Similarly, the channel identifier of the event may be checked against a list of allowed channel identifiers to determine if the trigger should be accessible within the channel. However, it should be understood that a variety of different methods may be used to determine the visibility of the triggers within the group-based communication system. Further, in some embodiments, the determination of whether the trigger should be added may be made based on one or more criteria associated with the trigger visibility parameters 211. For example, it may be determined whether one or more event parameters of a trigger event satisfy one or more criteria of the trigger visibility parameters 211 and if the criteria are satisfied, one or more actions of the workflow may be executed. Here, for example, it may be determined whether a user identifier and a channel identifier from event metadata of an event match a set of identifiers defined in the trigger visibility parameters 211.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

The invention claimed is:

1. One or more computer-readable media storing computer-executable instructions that, when executed by a processor, perform a method of managing trigger visibility within a group-based communication system, the method comprising:
  receiving, via a user interface, a trigger definition for a trigger including a set of matching events and a set of trigger visibility parameters, the set of trigger visibility parameters configured to define visibility of the trigger within the group-based communication system;
  accessing a set of available triggers and determining whether to include the trigger in the set of available triggers based on the set of trigger visibility parameters; and
  responsive to determining that one or more criteria associated with the set of trigger visibility parameters are satisfied, adding the trigger to the set of available triggers based on the set of trigger visibility parameters.

2. The media of claim 1, wherein the set of trigger visibility parameters comprises a user parameter defining one or more user identifiers associated with the trigger and a resource parameter defining one or more resources of the group-based communication system associated with the trigger.

3. The media of claim 2, further comprising storing the trigger definition such that the trigger definition can be accessed by one or more users who satisfy the one or more criteria associated with the set of trigger visibility parameters.

4. The media of claim 1, further comprising:
   determining that one or more event parameters of a trigger event satisfy the one or more criteria associated with the set of trigger visibility parameters; and
   responsive to determining that the one or more criteria are satisfied, executing one or more actions of a workflow associated with the trigger.

5. The media of claim 1, wherein the method further comprises presenting, via the user interface, a set of suggested trigger visibility parameters.

6. The media of claim 1, further comprising:
   responsive to determining the one or more criteria associated with the set of trigger visibility parameters are not satisfied, not adding the trigger to the set of available triggers based on the set of trigger visibility parameters.

7. The media of claim 1, wherein the set of trigger visibility parameters specifies accessibility to the trigger definition based on one or more of an organization, a group-based communication channel, a user role, a user group, or a user identifier.

8. A method of managing trigger visibility within a group-based communication system, the method comprising:
   receiving, via a user interface, a trigger definition for a trigger including a set of matching events and a set of trigger visibility parameters, the set of trigger visibility parameters configured to define visibility of the trigger within the group-based communication system;
   accessing a set of available triggers and determining whether to include the trigger in the set of available triggers based on the set of trigger visibility parameters; and
   responsive to determining that one or more criteria associated with the set of trigger visibility parameters are satisfied, adding the trigger to the set of available triggers based on the set of trigger visibility parameters.

9. The method of claim 8, wherein the set of trigger visibility parameters comprises a user parameter defining one or more user identifiers associated with the trigger and a resource parameter defining one or more resources of the group-based communication system associated with the trigger.

10. The method of claim 9, further comprising storing the trigger definition such that the trigger definition can be accessed by one or more users who satisfy the one or more criteria associated with the trigger visibility parameters.

11. The method of claim 8, further comprising:
    determining that one or more event parameters of a trigger event satisfy the one or more criteria associated with the trigger visibility parameters; and
    responsive to determining that the one or more criteria are satisfied, executing one or more actions of a workflow associated with the trigger.

12. The method of claim 8, wherein the method further comprises presenting, via the user interface, a set of suggested trigger visibility parameters.

13. The method of claim 8, further comprising:
    responsive to determining the one or more criteria associated with the set of trigger visibility parameters are not satisfied, not adding the trigger to the set of available triggers based on the set of trigger visibility parameters.

14. The method of claim 8, wherein the set of trigger visibility parameters specifies accessibility to the trigger definition based on one or more of an organization, a group-based communication channel, a user role, a user group, or a user identifier.

15. A system for managing trigger visibility within a group-based communication system, the system comprising:
    a data store associated with the group-based communication system; and
    a processor programmed to perform a method of managing trigger visibility within the group-based communication system, the method comprising:
      receiving, via a user interface, a trigger definition for a trigger including a set of matching events and a set of trigger visibility parameters, the set of trigger visibility parameters configured to define visibility of the trigger within the group-based communication system;
      accessing a set of available triggers and determining whether to include the trigger in the set of available triggers based on the set of trigger visibility parameters; and
      responsive to determining that one or more criteria associated with the set of trigger visibility parameters are satisfied, adding the trigger to the set of available triggers based on the set of trigger visibility parameters.

16. The system of claim 15, wherein the set of trigger visibility parameters comprises a user parameter defining one or more user identifiers associated with the trigger and a resource parameter defining one or more resources of the group-based communication system associated with the trigger.

17. The system of claim 16, further comprising storing the trigger definition in the data store such that the trigger definition can be accessed by one or more users who satisfy the one or more criteria associated with the trigger visibility parameters.

18. The system of claim 15, further comprising:
    determining that one or more event parameters of a trigger event satisfy the one or more criteria associated with the trigger visibility parameters; and
    responsive to determining that the one or more criteria are satisfied, executing one or more actions of a workflow associated with the trigger.

19. The system of claim 15, wherein the method further comprises presenting, via the user interface, a set of suggested trigger visibility parameters.

20. The system of claim 15, further comprising:
    responsive to determining the one or more criteria associated with the set of trigger visibility parameters are not satisfied, not adding the trigger to the set of available triggers based on the set of trigger visibility parameters.

* * * * *